US007710548B2

(12) United States Patent
Braune et al.

(10) Patent No.: US 7,710,548 B2
(45) Date of Patent: May 4, 2010

(54) OPTOELECTRONIC MONITOR INCLUDING DYNAMIC TESTING UNIT

(75) Inventors: Ingolf Braune, Gundelfingen (DE); Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 287 days.

(21) Appl. No.: 11/977,176

(22) Filed: Oct. 22, 2007

(65) Prior Publication Data
US 2008/0106724 A1 May 8, 2008

(30) Foreign Application Priority Data
Oct. 27, 2006 (DE) ........................ 10 2006 050 768
Feb. 22, 2007 (DE) ........................ 10 2007 008 806

(51) Int. Cl.
*G01C 3/08* (2006.01)
(52) U.S. Cl. .................................... 356/5.01; 356/5.15
(58) Field of Classification Search ................ 356/5.01, 356/5.09, 5.1–5.15
See application file for complete search history.

(56) References Cited

U.S. PATENT DOCUMENTS

| | | | | |
|---|---|---|---|---|
| 4,699,508 A | * | 10/1987 | Bolkow et al. | 356/5.07 |
| 5,082,364 A | * | 1/1992 | Russell | 356/5.15 |
| 7,310,109 B2 | * | 12/2007 | Dottling et al. | 348/82 |
| 2001/0013929 A1 | * | 8/2001 | Torsten | 356/5.01 |
| 2005/0207619 A1 | | 9/2005 | Lohmann | |
| 2005/0265596 A1 | | 12/2005 | Lohmann | |
| 2007/0076189 A1 | * | 4/2007 | Kumagai et al. | 356/5.01 |

FOREIGN PATENT DOCUMENTS

| | | |
|---|---|---|
| DE | 100 21 590 C2 | 5/2000 |
| DE | 10138960 A1 | 2/2003 |
| DE | 103 60 789 A1 | 12/2003 |
| DE | 103 60 174 A1 | 7/2005 |
| DE | 102004035243 A1 | 2/2006 |

* cited by examiner

*Primary Examiner*—Isam Alsomiri
(74) *Attorney, Agent, or Firm*—Townsend and Townsend and Crew, LLP

(57) ABSTRACT

An optoelectronic monitoring device (1) with at least one light source (2) and at least one receiving element (4) which receives light from light source (2) that was reflected by an object. The receiving element determines the distance of the object. A testing unit (5-7) of the monitoring device checks the functionality of the receiving element (4) and modifies light received by the receiving element so that the receiving element (4) receives light which has been falsified by a predetermined or a known amount. A corresponding testing method is also described.

24 Claims, 3 Drawing Sheets

OPTOELECTRONIC MONITOR INCLUDING DYNAMIC TESTING UNIT

CROSS-REFERENCES TO RELATED APPLICATIONS

This application claims the priorities of German Patent Applications Nos. 10 2006 050 768.1 filed Oct. 27, 2006 and 10 2007 008 806.1 filed Feb. 22, 2007, the disclosures of which are incorporated herein by reference.

BACKGROUND OF THE INVENTION

This invention relates to an optoelectronic monitoring device that has at least one light source and at least one receiving element in accordance with the preamble of claim 1 and a testing method therefor in accordance with the preamble of claim 16.

Optoelectronic monitoring devices are used for a multitude of tasks ranging from preventing thefts to securing dangerous machines which must be timely automatically deactivated when an object and particularly when operating personnel approaches it. Technically particularly challenging are monitoring devices capable of measuring distances which not only detect the presence of an object but which also determine the distance to where it is located.

Such a distance determination is especially useful in connection with movable robots that pass an area that is used by operators and other personnel. For example, the robot might generate a warning beginning at a certain distance, or it can change to a slower operating mode, and when the robot passes a critical distance, it can be stopped altogether. Movable robots which are continuously subjected to changing scenes that come into their fields of view present particularly difficult problems.

For automobiles, cameras are used which take distance-resolved pictures in real time to optimize the controls for airbags, for example. In the case of an approaching accident, the release of the airbags can be adjusted depending on the sitting positions of the occupants that is determined on the basis of their distances. In addition, distance resolving pictures are used to recognize and classify other traffic, such as cars, bicycles or pedestrians. A further use is to automatically maintain distances from vehicles that are in front.

A requirement for monitoring is that the sensors which take a picture of the monitored region function properly. For example, they must be able to distinguish if the actual pictorial or video information corresponds to the external conditions, or if the picture has been "burned in". This is not easily determined because a constant picture might be caused by scenery that does not change or by a malfunction of the sensor.

WO01/78411 discloses a test method for picture sensors which are capable of processing brightness information for testing the functionality of the pixels. For this, a fixed contrast pattern of a monitored region can be moved relative to the picture sensor, the brightness of even individual zones or areas can be changed with additional illumination or with a movable test object, or a testing pattern can be used to check the functionality of the sensor. These approaches are not useful for determining distances when they involve variations in the brightness. Further, movements, whether by the sensor or separate testing objects, require mechanical structures and must vary not only the brightness, but also the distances.

It is further known to use laser scanners in which a laser beam is scanned over a monitored region, for example with a rotating mirror, and the respective distances are determined on the basis of the reflected light. A reference target can be positioned in a portion of the sector through which the laser beam is scanned, and it can even be positioned inside the housing for the monitoring device. The device is functional if it correctly determines the distance to the reference target. However, this approach also requires movable parts for scanning the laser beam. Further, if receiving chips are used which generate a linear or two-dimensional matrix-like distance picture instead of a laser beam, this testing method cannot be used.

German patent publication DE 101 38 960 A1 discloses an apparatus for monitoring a space with two picture-taking units that are arranged at a 90° angle with respect to each other. The two picture-taking units take pictures of the entire space, and distances are calculated on the basis of differences in the brightness at the two picture-taking units. The functionality of the units is checked with a self-test by turning the illumination of the space on and off to thereby render the observed scene dynamic. This is sufficient to check whether the device reacts at all, but involves no checking if the distances calculated from the brightness differences are in fact correct.

German patent publication DE 10 2004 035 243 A1 teaches a camera arrangement for monitoring a dangerous area by temporally changing its illumination, for example by modulation, and the resulting changes are detected by a test sensor. The device then tests its functionality by checking whether the pictures taken by the camera vary appropriately from a change determined by the test sensor. This does not involve checking the measured distances, because the camera arrangement cannot per se determine distances since it operates two-dimensionally.

BRIEF SUMMARY OF THE INVENTION

It is therefore an object of the invention to provide a relatively inexpensive functional test for optoelectronic monitoring devices capable of determining distances.

This object is attained with an optoelectronic monitoring device made according to claim 1 and a testing method for an optoelectronic monitoring device according to claim 16. An advantage of the invention is that errors or malfunctioning of the monitoring device can be simply and reliably recognized even in front of a constant, non-changing background. The test itself relies on optoelectronic components and requires no further mechanical arrangements such as are needed, for example, for moving a laser beam or a testing pattern.

The solution provided by the present invention is based on rendering the incoming signals for the receiving element dynamic. This is attained by a preplanned manipulation of the received light which superimposes onto a scenery the dynamics needed by the test.

Several receiving elements are preferably arranged in a row or over a surface, especially in a line or a two-dimensional matrix arrangement, to thereby generate a distance resolving pixel picture. Such a picture permits a substantially more accurate evaluation than are attainable with individual receiving elements. Several receiving elements can be arranged along a line or in a matrix arrangement on a receiving chip.

The light source and/or the receiving element are preferably immovably fixed relative to the monitoring device. This is only possible because the test employs optoelectronic components and requires no mechanical movements. This has the distinct advantage that no costly mechanical movement devices, which additionally require maintenance, are needed.

It is preferred that the testing unit modifies the incoming light with an additional light source that directs its light to the receiving element. This involves an internal test that is not affected by the observed scenery. The test is therefore reliable and independent of the surrounding light.

It is even more preferred to use a beam splitter with the additional light source. For space and geometric reasons, the additional light source cannot be placed immediately in front of the receiving element because this would interfere with the light path from the monitored region. A beam splitter solves this geometric problem.

Alternatively, the additional light source can beam its light directly to the receiving element. In this arrangement, no light is lost as a result of the presence of a beam splitter, and the additional light source must be configured so that light from the monitored region can pass it.

It is preferred that the additional light source is ring-shaped. This gives it a simple geometry that permits the passage of light from the monitored region.

In another arrangement, the light source that emits the light pulse and the receiving element for determining the distance operates on the basis of the elapsed time of a measurement light pulse. The testing unit is configured to positively or negatively delay a test light pulse emitted from the additional light source relative to the emitted measurement light pulse and to direct the test light pulse to the receiving element. Such a delay is interpreted by the receiving element as constituting elapsed time for the light, and therewith as distance, so that the functionality of the device can be reliably tested.

It is preferred that the light source for emitting the measurement light pulse and the receiving element for determining the distance operate on the basis of the elapsed time of the measurement light pulse. In this arrangement, the testing unit is configured to direct the test light pulse from the additional light source without delay to the receiving element. This test is simpler than the one described in the preceding paragraph, which can only measure the fixed length of the optical path from the additional light source to the light receiver, but no variable distances. This test does not check all possible errors. However, if the test is successful, it is certain that the light receiver functions properly, and in principle it is also possible to determine distances.

In another form of the invention, the light source emits modulated light and the receiving element for determining distances operates on the basis of the phase of the modulated light. For this, the testing unit is configured to direct modulated light of a given phase from the additional light source directly to the receiving element. In this embodiment, the artificial phase shift is interpreted as a measurement of the distance and thereby tests the functionality of the receiving element.

Analogous to the elapsed time embodiment, in the phase embodiment of the invention, the distance can be tested with and without artificial delays. In a simple test, which corresponds to the elapsed time test without delay, a phase can be superimposed onto the modulated light so that the distance that is to be measured corresponds to the length of the optical path from the additional light source to the light receiver ("phase 0"). However, the phase can also be artificially shifted with results that correspond to an artificial positive or negative time delay.

It is advantageous to construct the testing unit so that it can check the accuracy of an apparent distance determined with modified light by comparing it with the expected distance. This includes comparing the accuracy with a minimum degree of acceptable accuracy, which can include a temperature sensor so that temperature dependent minimal accuracies are obtained from a stored temperature graph or diagram. This test is not limited to measuring distances. Since the expected results of the test distance measurement are fixed, relative measurement errors can be determined by a simple comparison. For this measurement error, boundaries can be preestablished which determine up to what point the monitoring device can be considered to function correctly. Since the accuracy of the light receiver is temperature dependent, accuracy limits can be more precise when the actual temperature is known, which can then be corrected with the help of a previously measured and stored temperature graph.

The monitoring device preferably includes a protective shield. The additional light source beams its light through the protective shield onto the receiving element. The testing unit is capable of checking the light transmissivity of the protective shield by comparing an expected intensity from the additional light source with the actual intensity. Directing the light through the protective shield has the significant advantage that the protective shield represents a possible error source, and by directing the light through it a larger proportion of the optical path for the light in actual use can be tested. In addition, the protective shield absorbs a portion of the light intensity so that the additional light does not quickly lead to a saturation situation. In an alternative embodiment, an external light source is used for the test and its light is beamed through the protective shield directly onto the light receiver. In this case, a separate additional light source can be dispensed with.

The present invention also provides that the testing unit can modify the incoming light from the light source. Contrary to the just-described embodiment, the receiving unit is not internally simulated. Instead, test information is superimposed onto the externally received light. This test information renders the scenery dynamic and thereby makes a reliable functional test possible.

The light source for sending a measurement pulse and the receiving element for determining the distance preferably operate on the basis of the elapsed time of the measurement pulse, and the test unit is configured to superimpose onto the measurement light pulse a positive or negative elapsed time delay. The difference between the elapsed time for the measurement pulse is interpreted by the receiving element as a distance difference. When this difference is detected, functionality is reliably proven.

In another preferred form of the invention, the light source emits modulated light, and the receiving element determines the distance on the basis of the phase of the modulated light. The testing unit is configured to superimpose onto the modulated light an additional phase. This provides a reliable functional test when the distances are determined with modulated light as described above.

The testing method of the present invention provides advantages that are similar to those provided by the monitoring device. Various modifications of the testing methods are for example set forth in the dependent claims below.

Further advantages and features of the present invention are described by way of example and with the help of exemplary embodiments with reference to the figures of the appended drawings.

DETAILED DESCRIPTION OF THE PREFERRED EMBODIMENTS

Figure 1:
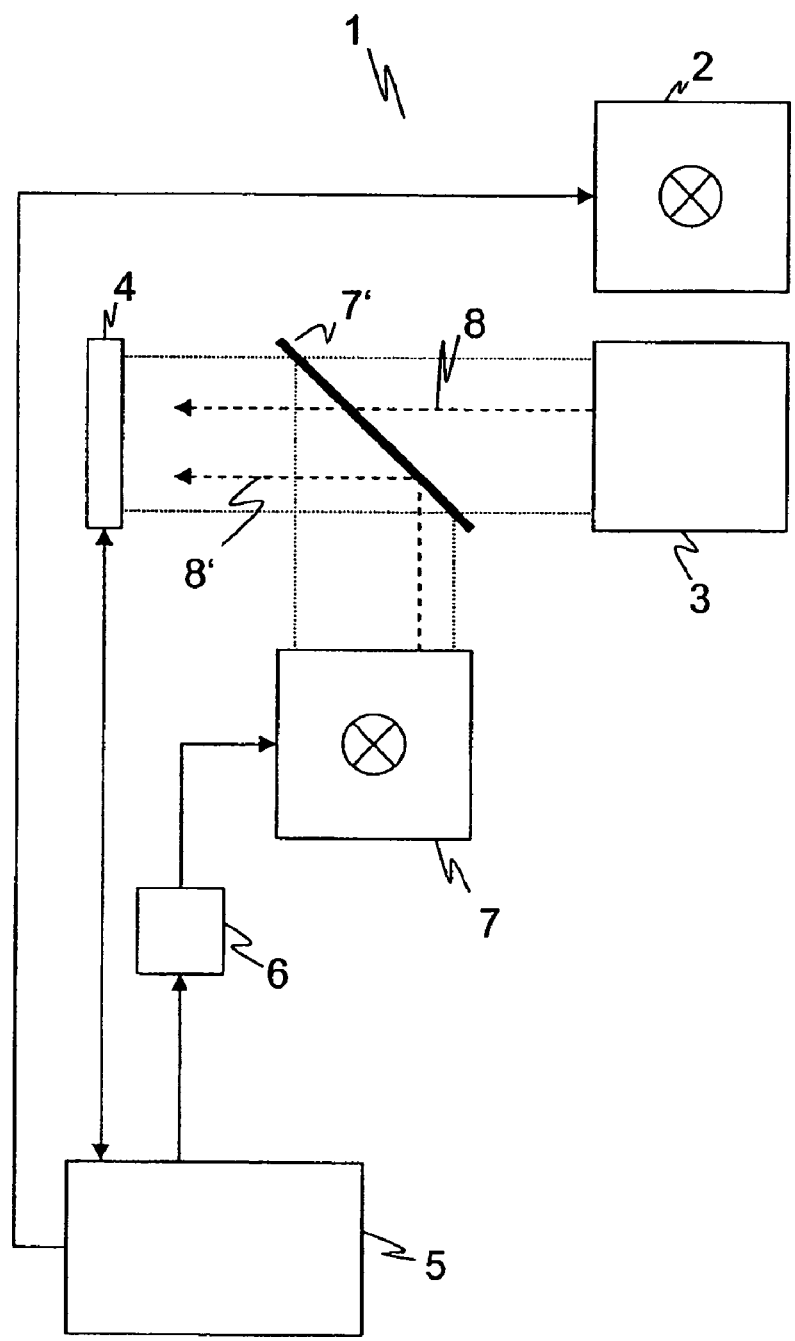
FIG. 1 illustrates a first embodiment of the invention which includes an internal additional light source and a beam splitter.

FIG. 1 illustrates a first embodiment of an optoelectronic monitoring device 1 constructed in accordance with the present invention. Light from a light source 2 illuminates a scenery (in the drawing, the right side of the drawing sheet). Light returned from the scenery is directed to a picture sensor 4 via a focusing optics 3. Monitoring device 1 serves to recognize objects in a monitoring zone of the scenery.

Such recognitions have a multitude of uses ranging from automation to burglary prevention. The recognized objects can be counted, their movement can be determined, or their presence can be classified as a permitted or prohibited presence in the monitored zone. If an object is a prohibited object, a warning signal can be generated. This is useful for safety purposes to secure, for example, a dangerous area into which no objects may enter, or to timely deactivate a dangerous machine when an object nevertheless enters a prohibited zone.

The drawing is greatly simplified. Typically, the described elements are located inside a housing or a tubular member to reduce the effects of outside or stray light. Since the basic construction of monitoring device 1 is well-known and often utilized, the present application does not further describe details of the tubular member or the precise selection of apertures and lenses of the focusing optics 3. It is only important that following a reflection at the scenery, sufficient light from light source 2 is focused onto picture sensor 4 to enable a distance determination.

Light source 2 can be a laser diode, and its reflected light beam strikes a single photo cell of picture sensor 4. However, it is preferred that picture sensor 4 has a multitude of receiving units arranged along a line or in a two-dimensional matrix or which are otherwise arranged in a way appropriate to the particular application. Picture sensor 4 can for example be a CCD chip or a CMOS chip.

Picture sensor 4 communicates with a control unit 5. Control unit 5 is further coupled to light source 2 for controlling the generation of a desired illumination pattern.

In the following it is assumed that each receiving element of picture sensor 4 has its own evaluation unit. As is further described below, evaluation units are used to determine the distance of the viewed area, and they forward to the control unit 5 only the finalized distance data. They can typically also be used to determine the light intensity, which is not further considered herein. Alternatively, it is of course possible that the receiving elements only communicate the raw data, which is then further processed by control unit 5. In this embodiment employing a centralized distance determination and calculation, the present application describes the invention as if it were associated with receiving elements that themselves determine the distances.

The distance determination takes place in accordance with the present invention in one of two ways, although both approaches could also be implemented together. In accordance with one type of distance determination, light source 2 emits a light pulse and its elapsed time is determined by picture sensor 4. Due to the short time intervals involved here, very precise electronics are required. Since the distances relevant to the present invention have an order of magnitude of about 10 meters, the elapsed time for such a distance is about 33 ns. In addition, fractions thereof should be determinable so that object movements of an order of magnitude of a few centimeters can be detected. To convert running time to absolute distance data, the monitoring device must first be calibrated. This can be done, for example, by sending the light to a target located at a known distance so that internal running times can be considered. Alternatively, an electro-optical shutter can be used to simulate a defined exterior running time. In a further alternative, relative distances can be used to determine, for example, how the relative distances differ for two successive distance pictures or for a single distance picture and a reference picture.

In the other embodiment, light source 2 emits modulated light, that is, light onto which an additional period is superimposed, for example by sinusoidally modulating the brightness of the light. The distance can be calculated from the phase difference between the modulated light at light source 2 and at picture sensor 4. Any ambiguity resulting from a phase shift by whole multiples is immaterial if the elapsed light running time in one period approximately corresponds to the observed distances or distance differences.

A constant distance sensed by a receiving element can be caused by a motionless scenery or by an error or deficiency of the receiving element. To test for the presence of such errors, a modifying device 6 is provided that is addressed by control unit 5.

The modifying device 6 in turn controls an additional light source 7. Depending on the particular embodiment, modifying device 6 generates a light pulse at a precise point in time or modulated light of a predetermined phase. The additional light source is configured so that light receiver 4 functions in its optimal operating range and is not driven to its saturation point. It employs typical signal values as are encountered when detecting objects in normal use.

A beam splitter 7' diverts light from additional light source 7 onto picture sensor 4. There is therefore a light path 8 of external light from the scenery which is transmitted through beam splitter 7' and a light path 8' from the additional light source 7 that is reflected by beam splitter 7'. In this manner, control unit 5 illuminates picture sensor 4 with a precisely timed light pulse or with light of a predetermined phase via modifying device 6, additional light source 7 and beam splitter 7'.

The receiving elements of picture sensor 4 are functionally tested as follows.

To determine the distance on the basis of the elapsed time, control unit 5 initially turns off light source 2 since its light can interfere with the functional test. This can be avoided when light from additional light source 7 has an intensity sufficient to overpower the light reflected by the scenery.

Thereafter control unit 5 directs a start signal to picture sensor 4 as if light source 2 had emitted a light pulse. Outside the testing operation, an actual command to generate such a light pulse would be sent to light source 2. For the functionality test, such a command to light source 2 is omitted.

Control unit 5 sends a command with a predetermined time delay via modifying device 6 to the additional light source to emit a light pulse. This light pulse reaches picture sensor 4 with the known delay as compared to the start signal sent via beam splitter 7' and along light path 8'. From this, the receiving elements of picture sensor 4 determine the distance, which is of course fictitious because no light is received from the scenery. Control unit 5 receives the calculated distances and compares them with those that are expected for the predetermined and therefore known time delay. If there are deviations, an error or malfunctioning of the corresponding receiving unit is assumed. The delays can be varied to simulate for picture sensor 4 different distances within the overall measurement range.

A zero delay represents a special case because it does not involve an artificial delay. In this case, the distance that is to be determined is the length of optical path 8'. Here the control unit 5 can perform the function of modifying device 6 by activating the additional light source. This greatly simplifies the device and control effort for the test.

If the distance is measured with phase modulated light, the test is similar. In such a case, modulated light with a predetermined phase shift instead of a delayed light pulse is used. The receiving elements then calculate the distance from this artificial phase, and the result is compared with the expected results for the predetermined artificial phase. The artificial phase can be varied to test across the entire measurement range of picture sensor 4. Here too, the exceptional case of a zero phase should be mentioned, which involves no additional phase shift, so that the result is the length of optical path 8' if the monitoring device 1 is operative.

A measurement error can be recognized with the distances resulting from the test since the length of optical path 8' and the fictitious additional length due to the delay are known. The testing can include a comparison of the measurement error with a required measurement accuracy. The required measurement accuracy can be stored as a fixed threshold value in control unit 5. Alternatively, the threshold value or values for each instrument can be stored ahead of time, for example during its production. The threshold values are more precise when, due to the temperature dependency of the accuracy of the light receiver 4, they are determined on the basis of this temperature dependency and are stored as such. The appropriate threshold value can be selected from the resulting stored, temperature dependent graph or diagram by measuring the actual operating temperature during the test with a temperature sensor.

In an alternative embodiment, light source 2 can take over the function of additional light source 7 by directing light from the former to light receiver 4. It is also possible to place the additional light source as a further element adjacent light source 2 outside the monitoring device. With this alternative, the light can be combined directly or through focusing optics 3.

Monitoring device 1 is typically mounted in a housing, and light enters and exits the housing through a light-transmitting frontal or protective shield. Due to the external positioning of light sources 2, 7, the light transmissivity of the protective shield can be checked to detect any damage or contamination thereof. The protective shield also dampens the intensity of the combined light to help prevent an oversaturation of the light receivers.

The optical capacity of light sources 2, 7 or their equivalent on light receiver 4 can be evaluated in control unit 5 to check its sensitivity. For one, this serves to check the light transmissivity of the protective shield as mentioned above. In addition, the range over which objects can be detected depends on this sensitivity. Should the sensitivity drop below a predetermined operative range of monitoring device 1, an error or malfunction can be detected.

Light sources 2, 7 can be positioned approximately at the focal distance of focusing optics 3. Light receivers 2 are then fully illuminated so that especially in the case of a CCD or a CMOS matrix, all pixels can be checked.

With the additional light entrained by beam splitter 7' and a constant scenery, a functional test of monitoring device 1 with only electronic commands is possible.

Figure 2:
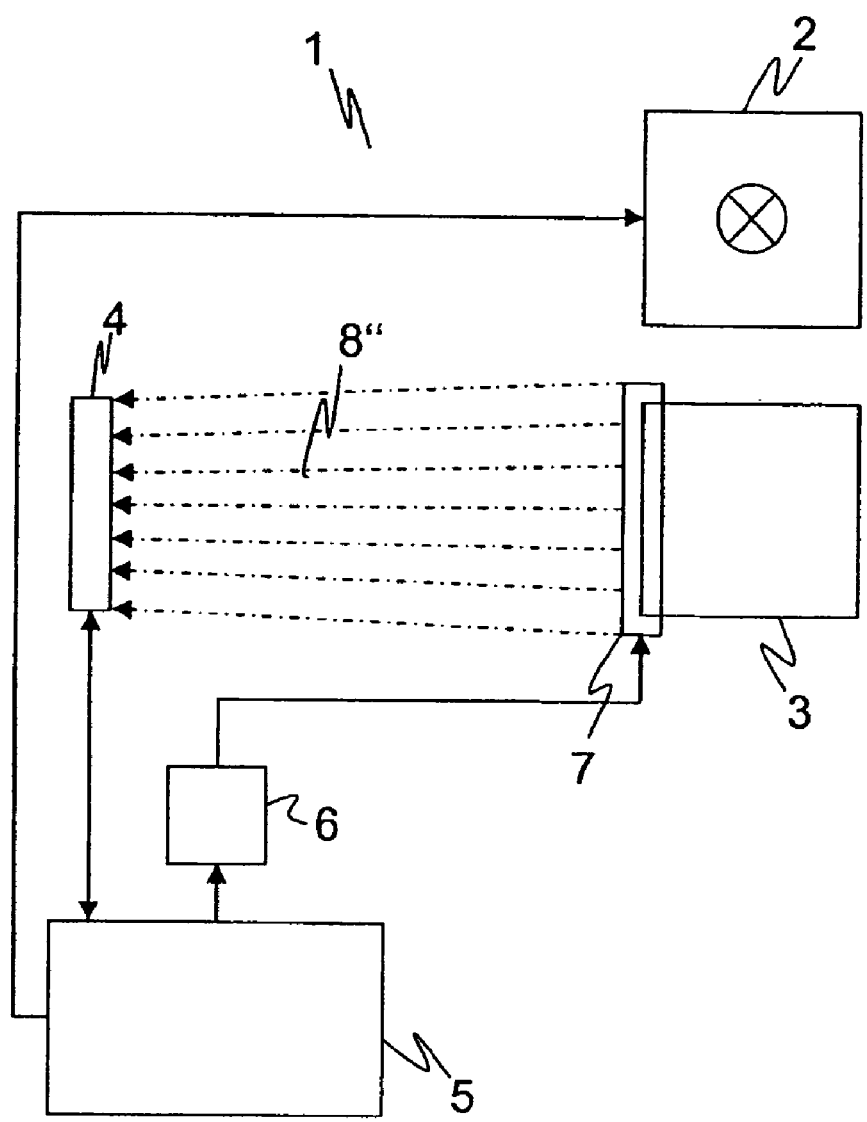
FIG. 2 illustrates a second embodiment of the invention utilizing a direct internal additional light source.

FIG. 2 shows a second embodiment of the invention. Here, as elsewhere, like elements and components are given the same reference numerals. In contrast to the above-described embodiment, the additional light is sent directly to picture sensor 4 instead of via the beam splitter 7'. Since additional light source 7 lies in the optical path of the reflected light from the scenery, as can be seen in FIG. 2, and would therefore cover that path, the additional light source 7 is geometrically shaped so that it does not disturb optical path 8. In the second embodiment of the invention, this is attained by giving the additional light source 7 a ring-shaped or annular configuration arranged about focusing optics 3, so that it can readily direct light along path 8" to picture sensor 4. Other geometric forms, such as a rectangular shape or another mounting configuration, can of course be used so long as they do not excessively interfere with the optical path 8.

For both the first and second embodiments described herein, as well as the two measuring methods employing the elapsed time or a phase determination, the additional light source 7 can be constructed of several parts so that for a given picture or test run different ranges of picture sensor 4, and therewith different receiving elements, can be tested by faking different distances.

The functional test according to the first and second embodiments is independent of the referenced scenery due to the internal additional light source, which makes it particularly well adapted for mobile installations.

Figure 3:
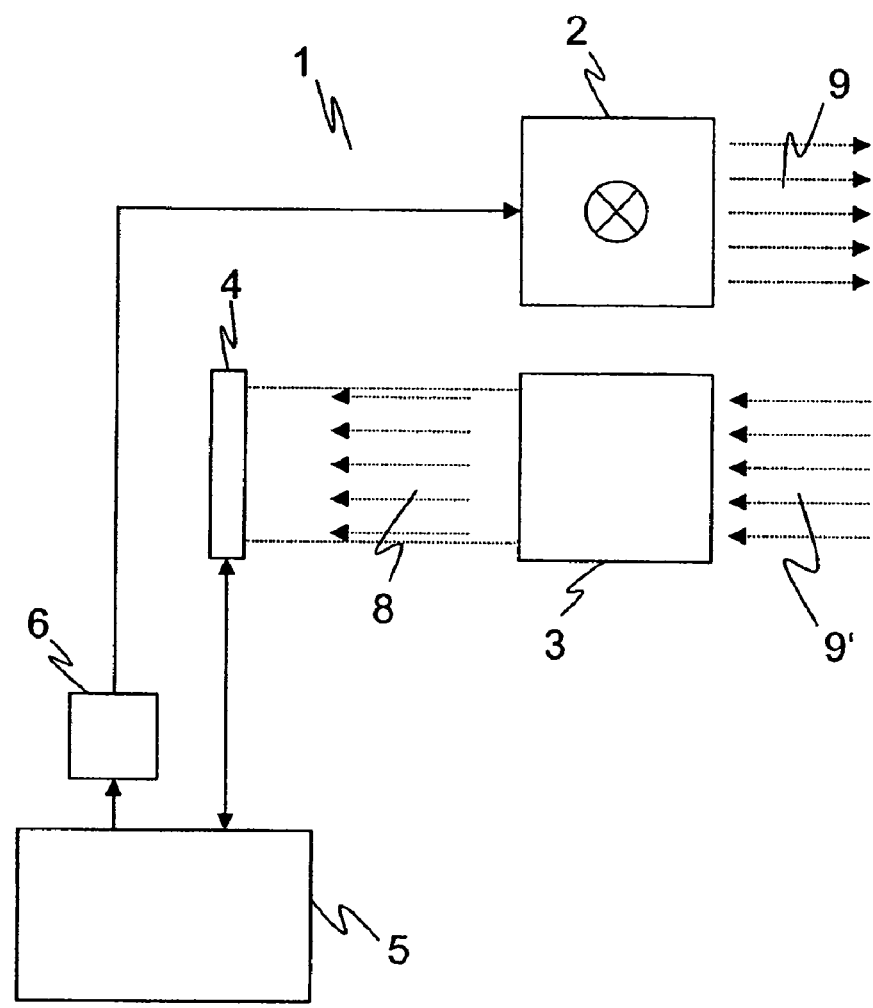
FIG. 3 illustrates a third embodiment of the invention which includes modification of light from the externally emitting light source.

FIG. 3 shows a third embodiment of the invention. This embodiment does not have an additional light source 7 and instead modifies the light from light source 2. Modifying device 6 is therefore placed between light source 2 and control unit 5.

The testing method of the present invention is correspondingly modified. Control unit 5 sends a command to modifying device 6 that the monitoring device is not operating normally and that a test will follow. It then issues an activation command via modifying device 6 to light source 2 and simultaneously therewith a synchronization signal to picture sensor 4. For distance measurements with delayed light pulses, the modifying device delays the light pulse by a predetermined amount. If the distance measurement is performed with modulated light, the phase is shifted by a predetermined amount.

The light from light source 2 is reflected by the scenery and reaches the receiving elements of picture sensor 4 via exit path 9, reflection path 9', focusing optics 3 and the optical path 8. They are not aware that a test is in progress and that the light has been modified and calculate the distance in the normal manner. The distance data is then forwarded to control unit 5.

Control unit 5 compares whether the distance picture is plausible. This requires that the distance data differs within a narrow tolerance range from that of a reference picture taken just prior to or after the test and by the amount faked or feinted by modifying device 6, or that was previously stored. Data from previously processed pictures can also be used as test data. This includes, for example, data from previously detected objects, background surfaces or the like which need not necessarily be compared in the plane of the individual pixels. Receiving units which do not detect the expected deviation must initially be considered to be defective and will need further, more comprehensive testing.

In accordance with the third embodiment, the scenery is made dynamic by appropriate manipulation so that an earlier defined and therewith correctable artificial measurement error is generated. Since the functional test in accordance with the third embodiment is based on reflected light, it is less well adapted for mobile monitoring devices 1 such as, for example, a movable robot or a vehicle. It must be assured that sufficient light is reflected by the background scene. However, the additional light source 7 can be omitted, and the entire signal path can be tested instead of only the internal path as in the other embodiments.

The disclosed tests can be used with distance measuring sensors in one-, two- and three-dimensional monitoring systems. The functional test can be expanded by including test cycles for a darkness test in which light is not combined and the scenery is not changed. With the dark noise, certain pixel errors such as burn-ins (stuck at low/stuck at high) can be found. With the earlier-described temperature graph, the expected background measurement can be determined at the measured temperature and compared with the actual dark noise. In several respects, this test is redundant but provides a relatively secure manner of detecting at least rougher failed functions.

REFERENCE NUMERALS

1—monitoring device
2—light source
3—focusing optics
4—picture sensor with receiving elements
5—control unit
6—modifying device
7—additional light source
8—optical path (from the focusing optics)
8'—optical path (from the beam splitter)
9—optical path (to the scenery)
9'—optical path (from the scenery)

What is claimed is:

1. A monitoring device (1) comprising
at least one light source (2) and at least one receiving element (4) adapted to determine a distance of the object receiving light emitted by the light source, reflected by an object and received by the receiving element, and
a testing unit (5-7) for monitoring a functionality of the receiving element (4) and configured to modify light directed to the receiving element (4) so that the receiving element (4) receives light that has been altered to reflect a predetermined or known difference from the actual distance of the object.

2. A monitoring device according to claim 1 comprising a multiplicity of receiving elements (4) arranged in a row or a surface, and in particular a line or a two-dimensional matrix, which are functionally combined to provide a distance resolving pixel picture.

3. A monitoring device according to claim 1 wherein the light source (2) and/or the receiving element (3) are fixed relative to the monitoring device (1).

4. A monitoring device according to claim 1 wherein the testing unit (5-7) includes an additional light source (7) and the testing unit modifies light directed to the receiving element (4) by directing light from the additional light source to the receiving element.

5. A monitoring device according to claim 4 including a beam splitter (7') operatively coupled to the additional light source (7).

6. A monitoring device according to claim 4 wherein the additional light source (7) directs light directly into the receiving element (4).

7. A monitoring device according to claim 6 wherein the additional light source (7) has an annular shape.

8. A monitoring device according to claim 4 wherein the light source (2) is configured to emit a light pulse and the receiving element (4) is configured to determine the distance on the basis of the elapsed time of the light pulse, and wherein the testing unit (5-7) is configured so that the additional light source (7) emits a test light pulse with a predetermined positive or negative delay relative to the emitted measurement light pulse and directed into the receiving element (4).

9. A monitoring device according to claim 4 wherein the light source (2) emits a measurement light pulse and the receiving element (4) determines the distance on the basis of the elapsed time of the measurement light pulse, and wherein the testing unit (5-7) is configured so that the additional light source (7) directs a test light pulse without delay into the receiving element (4).

10. A monitoring device according to claim 4 wherein the light source (2) emits modulated light and the receiving element (4) determines the distance on the basis of the phase of the modulated light, and wherein the testing unit (5-7) is configured so that the additional light source (7) directs modulated light having a predetermined phase into the receiving element (4).

11. A monitoring device according to claim 4 wherein the testing unit (5-7) compares an apparent distance obtained during a test with the modified light with an expected distance to determine the accuracy of the test, wherein the accuracy is compared to a minimum accuracy, and wherein a temperature sensor is provided for using a temperature dependent minimum accuracy from a stored temperature curve for comparing the apparent distance to the expected distance.

12. A monitoring device according to claim 4 comprising a protective shield, wherein the additional light source (7) directs its light through the protective shield into the receiving element (4), and wherein the testing unit is configured to compare the expected intensity of the light from the additional light source (7) with the actual light intensity for checking the light transmissivity of the protective shield.

13. A monitoring device according to claim 1 wherein the testing unit (5-7) is adapted to modify the light from the light source (2).

14. A monitoring device according to claim 13 wherein the light source (2) is adapted to emit a measurement light pulse and the receiving element (4) is adapted to determine the distance on the basis of the elapsed time of the measurement light pulse, and wherein the testing unit (5-7) is configured to superimpose onto the measurement light pulse one of a positive and a negative running time delay.

15. A monitoring device (1) according to claim 13 wherein the light source (2) is configured to emit modulated light and the receiving element (4) is configured to determine the distance on the basis of a phase of the modulated light, and wherein the testing unit (5-7) is adapted to superimpose onto the modulated light an additional phase.

16. A method for testing a functionality of an optoelectronic monitoring device (1) having at least one light source (2) and at least one receiving element (4) adapted to determine a distance of the object receiving light emitted by the light source, reflected by an object and received by the receiving element, comprising
modifying light directed to the receiving element (4) so that the light corresponds to a wrong distance which differs from the actual distance by a predetermined or known amount, and
testing whether the receiving element (4) emits a distance information that corresponds to the actual distance or to the wrong distance.

17. A method according to claim 16 that is a static method and includes immovably fixing the light source (2) and the receiving element (4) with respect to the monitoring device (1) and not entraining a testing picture into the light.

18. A method according to claim 16 including modifying the light directed to the receiving element with an additional light that is directed to the receiving element (4).

19. A method according to claim 18 wherein the additional light is directed to the receiving element via a beam splitter (7') or directly.

20. A method according to claim 18 wherein the distance measurement is performed by determining the running time of a measurement light pulse and wherein the additional light is directed into the receiving element (4) as a test light pulse with a predetermined positive or negative delay relative to the measurement light pulse.

21. A method according to claim 18 wherein determining the distance comprises using phase modulated light and directing the additional light as modulated light with a predetermined phase to the receiving element (4).

22. A method according to claim 16 wherein testing a functionality comprises modifying the light from light source (2).

23. A method according to claim 22 wherein determining the distance comprises measuring a running time of a measurement light pulse, and including modifying the measurement light pulse by applying one of a positive and a negative running time delay.

24. A method according to claim 22 wherein determining the distance comprises using phase modulated light and including modifying the light with an additional phase.

* * * * *